F. W. BÖSCH.
STEAM ENGINE.
APPLICATION FILED OCT. 31, 1916. RENEWED NOV. 22, 1921.

1,401,868.

Patented Dec. 27, 1921.

Inventor
Frederick W. Bösch

F. W. BOSCH.
STEAM ENGINE.
APPLICATION FILED OCT. 31, 1916. RENEWED NOV. 22, 1921.

1,401,868.  Patented Dec. 27, 1921.
4 SHEETS—SHEET 2.

Inventor
Frederick W. Bosch
by W. E. Schoenborn
Attorney

F. W. BOSCH
STEAM ENGINE.
APPLICATION FILED OCT. 31, 1916. RENEWED NOV. 22, 1921

1,401,868.

Patented Dec. 27, 1921.

Inventor
Frederick W. Bösch
by W. Schoenborn
Attorney

UNITED STATES PATENT OFFICE.

FREDERICK W. BÖSCH, OF CAMDEN, NEW JERSEY, ASSIGNOR TO WORTHINGTON PUMP AND MACHINERY CORPORATION, OF NEW YORK, N. Y., A CORPORATION OF VIRGINIA.

STEAM-ENGINE.

1,401,868.      Specification of Letters Patent.      Patented Dec. 27, 1921.

Application filed October 31, 1916, Serial No. 128,753. Renewed November 22, 1921. Serial No. 517,153.

*To all whom it may concern:*

Be it known that I, FREDERICK W. BÖSCH, a citizen of the United States, residing at Camden, in the county of Camden and State of New Jersey, have invented certain new and useful Improvements in Steam-Engines, of which the following is a specification.

My invention relates to improvements in steam engines of the construction generally designated as the uniflow type, and in which the live steam enters the cylinder at the ends thereof and the expanded steam is first exhausted through ports at or near the end of the stroke, distant from the admission ports, said ports being uncovered by the piston within the cylinder at or near the end of its working stroke and said exhausted steam finally conveyed by exhaust diverting valve or valves either directly to the atmosphere or condenser, or to a heating system or other lower pressure steam using expedients and condenser.

The objects of my invention are:

First, to construct an engine of the uniflow type capable of effecting all the functions above recited and also in which all the advantages of said type of engine are fully carried out without necessitating the use of abnormally long cylinder and piston and long ports or connecting passageways to the final exhaust.

Second, to construct an engine of the uniflow type, performing all the functions above indicated, in which the clearance and back pressure are reduced to a minimum and at the same time prevent the compression from exceeding the initial live steam pressure, thereby insuring the highest efficiency and economy at all speeds of the engine under all conditions.

Third, to construct an engine of the uniflow type in which the cylinder is provided with such an arrangement of admission and a plurality of main exhaust ports, a single valve controlling at proper times all of said main exhaust ports, auxiliary exhaust ports and final exhaust diverting valves for controlling said auxiliary exhaust ports, that it is capable of conducting the exhaust from a uniflow engine either to the atmosphere, condenser or other subsidiary apparatus such as a heating plant, or both, and employing a shorter cylinder and piston, greater simplicity of construction, less valve and valve mechanism, and at the same time reduce the compression lower than has been used heretofore.

Fourth, to construct an improved engine of that uniflow type in which the wearing surface of the cylinder is not cut up by numerous ports and in which the omission of intermediate exhaust ports at the middle of the cylinder where the piston speed is greatest, reduces not only to a minimum the much dreaded trouble of cylinder cutting by the reciprocation of the piston, but at the same time eliminates the additional clearance volume due to said intermediate exhaust ports and hence materially improves the thermal efficiency of the engine.

Fifth, to construct an engine of the uniflow type capable of effecting all the functions above indicated, in which the cylinder with its coöperating live steam and exhaust steam ports and minimum number of main and auxiliary exhaust valves are so arranged as to occupy a minimum of space and capable of being cheaply manufactured, easily assembled, inspected or repaired, while at the same time said ports and valves being so disposed, that the lower temperature of the expanded steam passing through said exhaust ports, will not be in proximity to, and affect the high temperature of the live steam passing through the admission ports and into the cylinder.

Sixth, to construct an engine of the uniflow type so as to greatly reduce the size and capacity of the condenser for such type of engines which, whenever running condensing also utilizes the exhaust steam in some heating system, or whatever the exhaust steam using expedient may be.

Other advantages and objects of the invention will appear from the detailed description of the construction and mode of operation of the invention to be presently disclosed.

My invention consists of structural characteristics and relative arrangement of elements which will be hereinafter more particularly pointed out in the appended claims.

In the accompanying three sheets of drawings similar reference characters indicate the same parts in the several figures in which:—

Referring to Figs. 1, 2, 5 and 6, 10 indicates a steam engine cylinder having the usual live steam admission ports 11 at the end of the cylinder controlled by admission or inlet valves 12, operated by any convenient form of valve gear, not shown. Puppet valves 12 are shown for controlling the admission of the live steam to the cylinder, but any other form of live steam distribution valves may be employed, without affecting the novel features of my invention and I contemplate using other forms of said valves, if so desired. It will also be understood that while I have shown valves 12, in connection with heads 13 and cylinder 10, provided with steam jackets to construct a steam-jacketed or heated cylinder which is completely insulated, as illustrated, any other form of heads and cylinders can be readily substituted therefor, or the valves may be within the cylinder casting without in any way modifying the construction and mode of operation of the essential features of my invention to be presently described.

Figure 19:
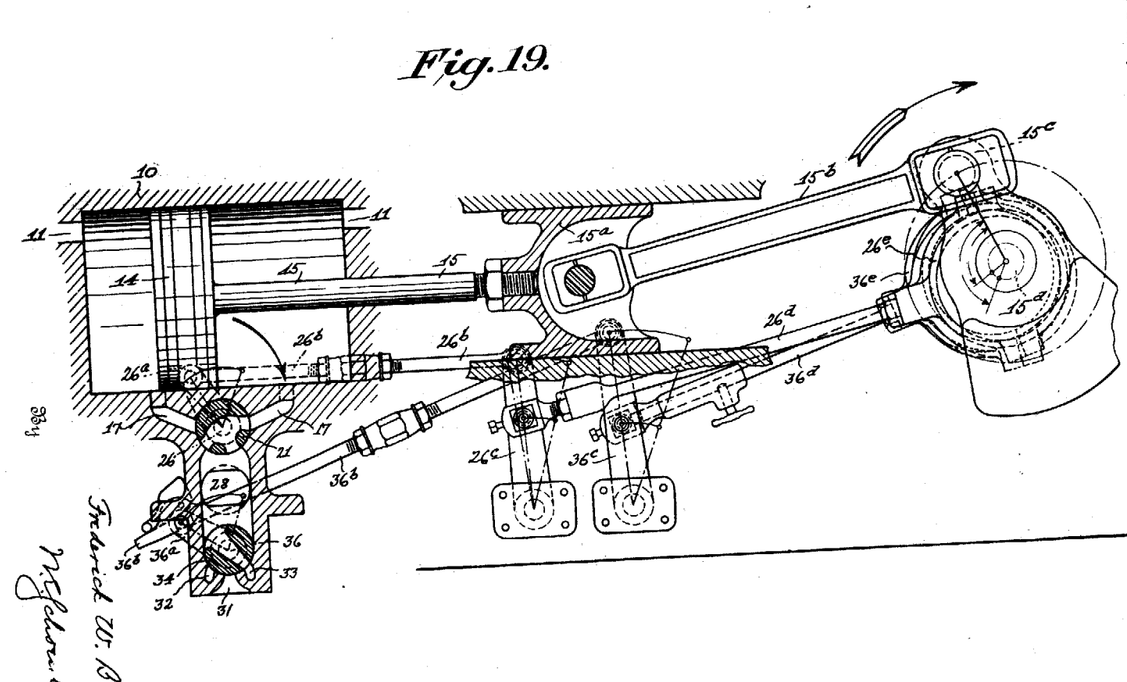
Fig. 19 is a longitudinal sectional view of the engine partly in side elevation showing the gear for properly operating the main exhaust and exhaust diverting valves.

Cylinder 10 is provided with the usual form of short piston 14, connected with a rod 15, cross head 15$^a$, connecting rod 15$^b$, crank 15$^c$ to a shaft 15$^d$, as shown in Fig. 19, or said piston rod 15 may be properly attached to any other form of transmission mechanism, depending on the form of suitable transmission gear necessary to effect the motion desired to be transformed from the reciprocations of the piston to the valves.

Preferably at the lower side and at a distance, substantially the width of the piston 14, from each end of the cylinder 10, is an exhaust port 17 or 18, separate and independent of each other and leading to and communicating with a common exhaust chamber 19, and each of said exhaust ports 17 and 18 instead of being one continuous opening where it enters the cylinder, is preferably formed of a series of openings by providing a plurality of bridge sections 16, as shown, in order to have a proper bearing for the lower portion of the piston 14 while passing over the extended exhaus port 17 or 18, and also prevent the packing rings of the piston springing out and uneven wear of the piston. Furthermore by having only two exhaust ports 17 and 18 one near each end of the cylinder 10, as shown, there is produced a uniflow engine cylinder having a smooth and unperforated bore at its center section or zone traversed by the piston during its highest speed while reciprocating within the cylinder. This construction and arrangement of providing no exhaust ports at the center section of the cylinder and area of highest speed of the piston not only prevents the cylinder from cutting, or undue wear of the piston and its packing rings, but at the same time reduces the clearance volume to a minimum owing to the elimination of the intermediate or central auxiliary exhaust ports.

Figure 1:
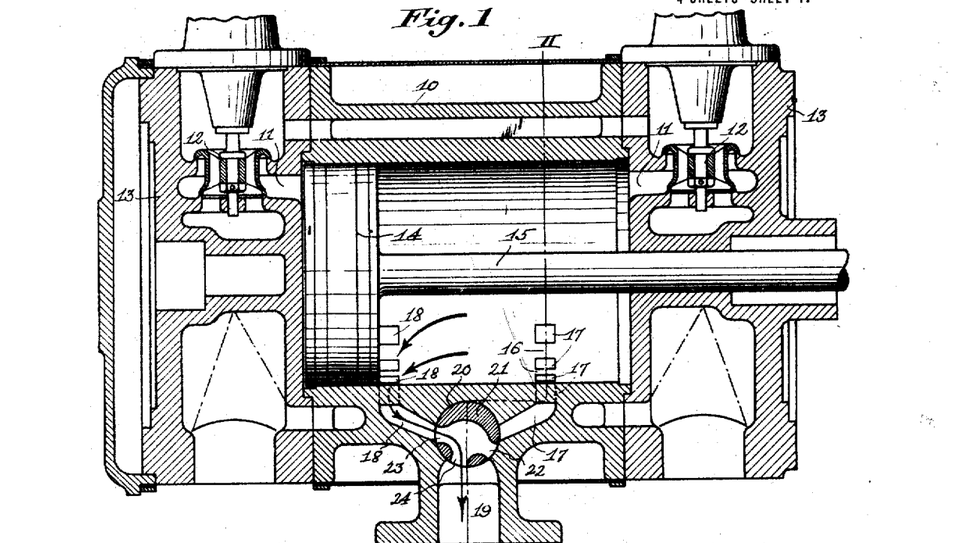
Figure 1 is a longitudinal sectional view of the engine taken on line I—I of Fig. 2.
Figure 3:
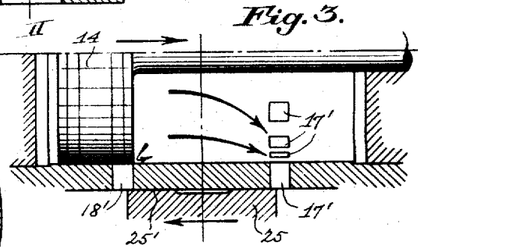
Fig. 3 is a modified form of a valve for controlling the exhaust ports of the cylinder.
Figures 5, 6, 7, 8, 9:
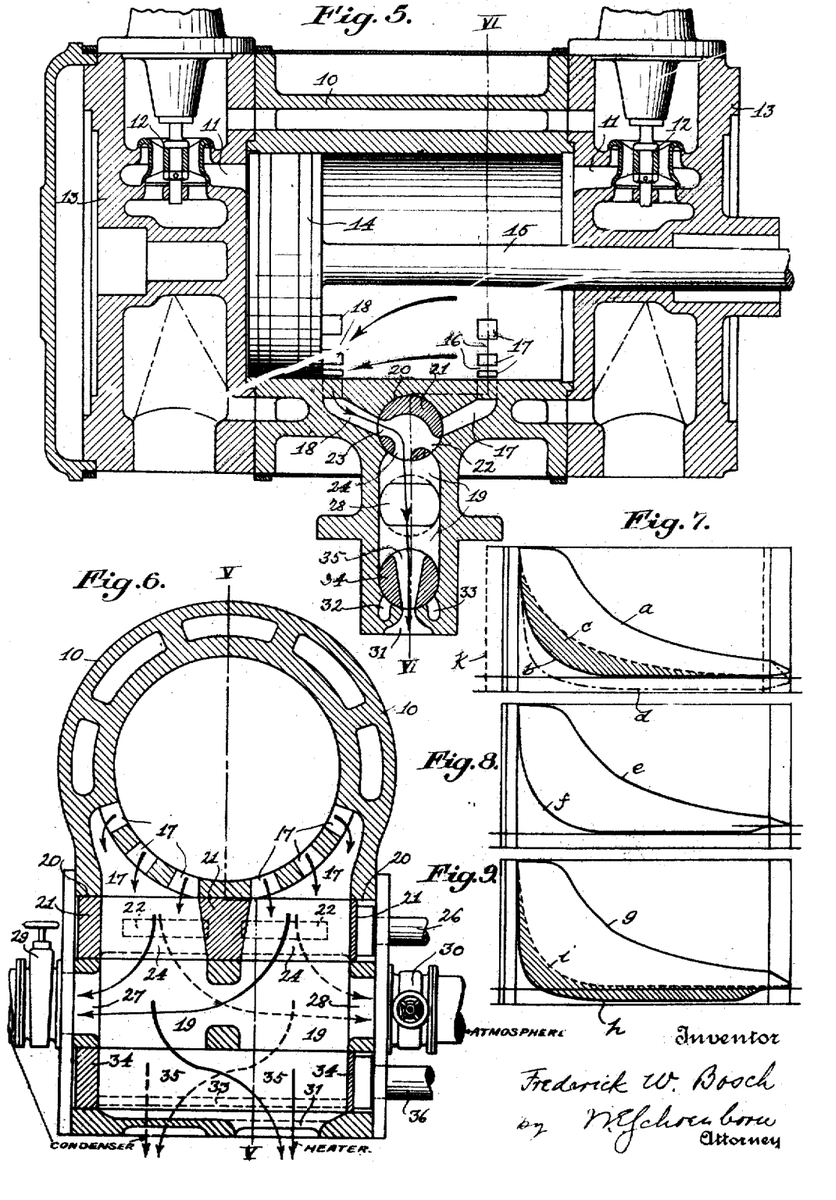
Fig. 5 is a longitudinal sectional view of the engine when provided with an exhaust diverting valve and taken on line V—V of Fig. 6.
Fig. 6 is a transverse section on line VI—VI of Fig. 5.
Fig. 7 is a comparative indicator diagram representing in full lines the pressures within the cylinder when the engine is running non-condensing and the exhaust diverting valve is cut out.
Fig. 8 is an indicator diagram representing the pressures within the cylinder when the engine is running non-condensing and a portion of the exhaust steam is utilized for heating or other subsidiary purposes.
Fig. 9 is an indicator diagram representing in full lines the pressures within the cylinder when the engine is running condensing and a portion of the exhaust is diverted for use in heating or other purposes.

Between the cylinder ends of the two exhaust ports 17 and 18 and the common exhaust chamber 19, is interposed an enlarged chamber 20, preferably circular in cross-section, as shown in which is provided an oscillating and main exhaust controlling valve 21, having cored therein ports 22, 23 and 24, communicating with each other, and port 22 adapted to register with cylinder exhaust 17, port 23 registers with cylinder exhaust port 18, and port 24 constantly in communication with ports 22 and 23 of the main exhaust controlling valve 21 and the common exhaust chamber 19. Said exhaust valve 21 is preferably of the Corliss or rotary type, but any other form of single valve may be employed whether rotary or oscillatory, as shown in Figs. 1 and 5, or a reciprocatory valve 25 on a valve seat 25', as shown in Fig. 3.

A stem or rod 26 is attached to the exhaust valve which may be connected to any moving part of the engine to be properly oscillated, rotated, or reciprocated, as shown for example in Fig. 19, by means of the crank arm 26ª, link 26ᵇ, rocker arm 26ᶜ, eccentric rod 26ᵈ, and eccentric 26ᵉ rotated by crank shaft 15ᵈ, in order that the proper ports of the exhaust valve 21 are correctly timed with respect to the cylinder exhaust ports 17 and 18 and position of piston 14.

While the foregoing disclosure is applicable to my invention in its broadest and simplest form, as shown in Figs. 1 to 4, inclusive, and in which no diversion of the exhaust steam is effected, it will be seen by reference to Figs. 5 to 18, inclusive, that I may combine with the herein and previously described uniflow engine means for diverting and utilizing the exhaust steam, and which is effected by providing and leading from the sides of the common exhaust chamber 19, outlets 27 and 28 controlled, respectively, by valves 29 and 30, said outlet 27 communicating with a condenser, or any other auxiliary apparatus utilizing low pressure exhaust steam, as for example a feed water heater or steam heating plant, and an outlet 28 communicating preferably with the atmosphere for purposes to be presently described.

Communicating with the lower section of the common exhaust chamber 19, and below the valve controlled outlets 27 and 28, are two outer and a central final exhaust ports or passageways 31, 32 and 33, said central port 31 communicating preferably with a steam heating system or other low pressure steam using accessory of the plant at which the engine is installed, and the two outer ports or passageways 32 and 33 leading to and connected with a condenser or to the atmosphere.

Figure 18:
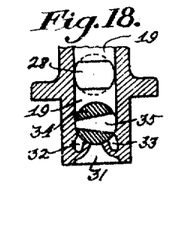
Fig. 18 is a fragmentary and sectional view of the final exhaust passageways and exhaust diverting valve, when the engine is running full condensing or non-condensing and said valve has been made inoperative.

Supported in a seat formed in and at the lower end of the common exhaust chamber 19 is an oscillating exhaust diverting valve 34 having a single port 35 adapted to register during the oscillation of the valve 34, depending on its position, with either of the ports or passageways 31, 32 or 33, whereby said ports or passageways 31, 32 or 33 are connected with the common exhaust chamber 19, and either the condenser or atmosphere or steam heating system for purposes to be hereinafter described. Said valve 34, while shown of an oscillating type, may be of any other form, whether rotary or reciprocating, and is provided with a stem or rod 36, connected to any moving part of the engine valve gear to be properly oscillated, rotated or reciprocated, as shown for example in Fig. 19, by means of the arm 36ª, link 36ᵇ, rocker arm 36ᶜ, eccentric rod 36ᵈ and eccentric 36ᵉ rotated by crank shaft 15ᵈ, in order that its port 35 is correctly timed with respect to the ports leading to the passageways 31, 32 and 33, and the position of the ports 22, 23, and 24, of the valve 21, when in communication with the exhaust ports 17 and 18 and exhaust chamber 19. The rod 36 attached to the valve 34 is detachably connected with the valve gear, as shown for example in Fig. 19, by disconnecting or unhooking the link 36ᵇ from the valve arm 36ª, a common expedient and readily understood, so that said valve 34 may be made inoperative by being turned in a position as shown in Fig. 18, to cut off communication at all times between the exhaust chambers 19 and ports or passageways 31, 32 and 33 for purposes to be hereinafter explained.

Referring to the form of the invention shown in Figs. 5 and 6, the different operations of the uniflow engine throughout all its phases of movements, showing the relation of the piston 14 with the cylinder exhaust ports 17 and 18, and the main exhaust valve ports 22, 23 and 24 to said ports 17 and 18, and the port 35 of auxiliary valve 34 diverting the exhaust into either of passageways 31, 32 or 33, when the valves 29 and 30 are in their closed position and the outlets 27 and 28 leading from the exhaust chamber 19 are cut off, are fully shown and will be clearly understood following the motions of the piston and path of the exhaust steam indicated by the arrows in Figs. 10 to 17.

Figure 10:
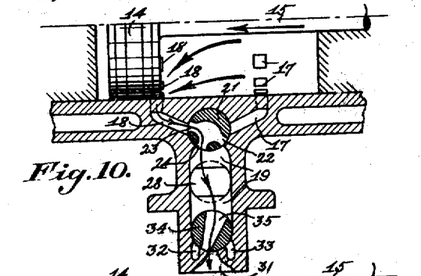
Figs. 10 to 17, inclusive, are diagrammatic views showing the different positions of the piston, single main exhaust valve with respect to the cylinder exhaust ports, and the exhaust diverting valve with respect to the main exhaust valve and final exhaust ports throughout one entire cycle of operation of the engine.

Fig. 10 shows the piston 14 approaching the end of stroke to the left and having begun to uncover the cylinder exhaust port 18, with the exhaust valve 21 in such a position to permit the first of the expanded steam to exhaust through valve ports 23 and 24 into the common exhaust chamber 19, and thence through the port 35 of exhaust diverting valve 34, and beginning to pass into the port or passageway 31 leading to the steam heating utilizing accessories.

Figure 11:
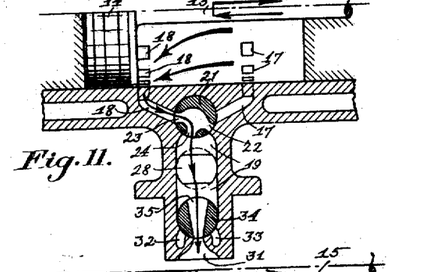

In Fig. 11, the piston 14 is at the end of stroke to the left, and about to receive live steam and begin stroke to the right with cylinder exhaust port 18 completely uncovered, and the expanded steam continues to pass out port 18, through valve ports 23 and 24 into exhaust chamber 19, and thence through ports 35 and 31 into steam heating system or whatever the steam using expedient may be.

Figure 12:
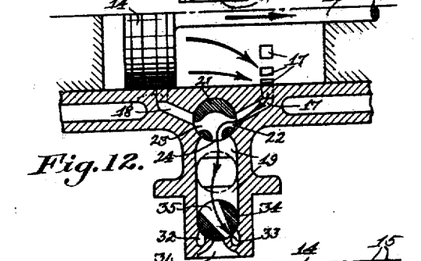

In Fig. 12, the piston 14 has closed the cylinder exhaust port 18 and the exhaust valve 21 has assumed the position to permit the expanded steam at reduced pressure and temperature to exhaust through cylinder port 17 and valve ports 22 and 24 into the exhaust chamber 19 and the exhaust diverting valve 34 has assumed such a position, so that its port 35 is in communication with the port 33, whereby the remaining vapor or expanded steam of reduced volume, temperature and pressure is conveyed to the condenser or atmosphere as the case may be.

Figure 13:
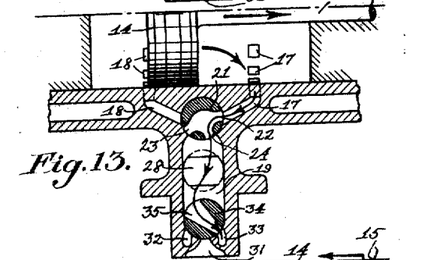

In Fig. 13, the piston 14 has uncovered the port 18, and the exhaust valve 21, has closed said port 18 and continued to open port 17, thereby permitting the expanded steam of reduced pressure to still pass through the cylinder exhaust port 17 through valve ports 22 and 24 into the exhaust chamber 19 and thence through exhaust diverting valve port 35 and port 33 to the condenser or atmosphere.

Figure 14:
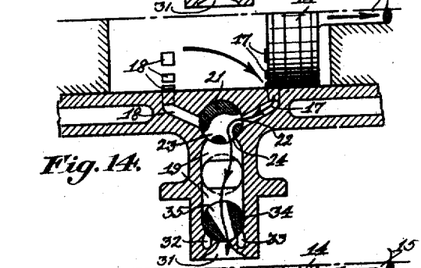

In Fig. 14 the piston has uncovered port 18 and begun to uncover port 17, and the valve 21 has continued closing port 18, and the expanded steam of the following or opposite power stroke and of a higher pressure and temperature than that exhausted during operations indicated in Figs. 12 and 13, begins to pass through the cylinder port 17, valve ports 22 and 24 into exhaust chamber 19, and the exhaust diverting valve port 35 has assumed the position having begun opening the port 31 leading to the heating system or the like, for the further utilization of the heat still remaining in the expanded steam first exhausted from the engine cylinder.

The remaining expanded or low pressure vapor trapped between the piston 14 and cylinder head when said piston is passing over and closing ports 17 is properly compressed to insure smooth running of the engine.

Figure 15:
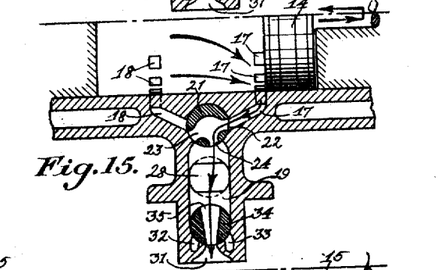
Figure 16:
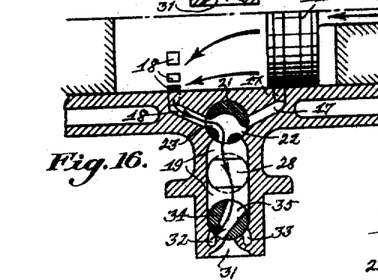
Figure 17:
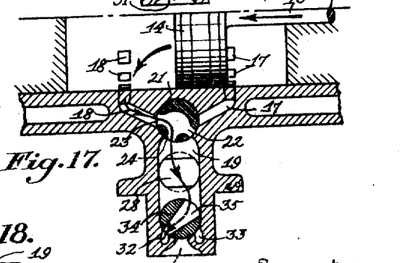

In Figs. 15, 16 and 17, the operations above indicated are the same as described with reference to Figs. 11, 12 and 13, respectively, except that the piston 14, exhaust valve 21, and exhaust diverting valve 34 are moving in the opposite direction, and the expanded steam is mainly exhausted through the port 17 instead of port 18 as shown in Fig. 11, and through valve port 35 into the port 31 connecting with the heating system, and the exhaust diverting valve port 35 later communicates with the port 32 instead of port 33 as shown in Figs. 12 and 13.

From the foregoing disclosure of the operation of my invention, it will be seen that the cylinder exhaust ports 17 and 18 are only opened one after the other in uniflow rotation, and the exhaust port 17 or 18 is opened at the end of the stroke and performs the function of the main exhaust, and the other exhaust port 17 or 18 depending whether it is the stroke to the right or left, is more or less the auxiliary port for that particular stroke, and the main exhaust port for one stroke is an auxiliary exhaust port for the opposite stroke, whereby the remaining vapor or highly expanded steam is permitted to escape and delay the compression until the piston 14 has cut off and closes the exhaust port 17 or 18.

From this disclosure it will also be observed that one of the most important features of the present invention is that with a simple and single exhaust diverting valve used in conjunction with a single main exhaust valve controlling only two independent cylinder exhaust ports of a uniflow engine, I am able to convey the greater part of the heat units remaining in the expanded steam to a steam heating system or other subsidiary apparatus of the plant, while the remaining portion and highly expanded steam is conveyed to a condenser or atmosphere as the case may be thereby reducing the back pressure to a minimum, and most efficiently operating the engine. While I have shown and described the ports or passageways 32 and 33 as leading to a condenser or to the atmosphere, I do not limit myself to this arrangement as one of the primary objects of my invention is to divide the exhaust steam from a uniflow engine of the type disclosed into two volumes at different pressures, in order to fully utilize the heat units remaining in the exhaust steam, and at the same time not impair the high efficiency of the uniflow engine.

Figure 4:
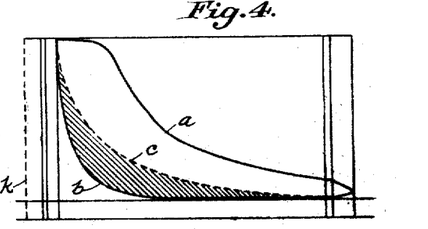
Fig. 4 is an indicator diagram representing in full lines the pressures within the cylinder of the engine shown in Figs. 1 and 2.

When the engine is to be used, so that all the exhaust steam is passed out into the atmosphere or full non-condensing, the valve 20 is opened, outlet 27 is shut off by closing down the valve 29, and the exhaust diverting valve 34 is disconnected from its valve gear, as heretofore explained, turned and locked in the position as shown in Fig. 18, thereby cutting off said ports 31, 32 and 33 from the exhaust chamber 19 and hence the exhaust passes directly from the cylinder exhaust ports 17 and 18 through valve 21, into chamber 19, through the port 28 to the atmosphere. When the uniflow engine herein described is operated non-condensing as just described, the indicator diagram produced is represented by the diagram shown by the full lines $a$ and $b$ in Figs. 4 and 7. The dotted line $c$ in Figs. 4 and 7 represents the compression line of the original and prior uniflow engines, and the shaded area between the lines $b$ and $c$ of Figs. 4 and 7, graphically represents the gain and increased efficiency of my form of uniflow engine, wherein the clearance spaces at the ends of the stroke are reduced to a minimum and abnormal compressions eliminated, over that of prior uniflow engines in which long pistons and large clearance spaces are employed. In order to avoid excessive compressions in the usual form of uniflow engines, large clearance volumes at the ends of stroke are necessitated, and the percentage of the stroke of such clearances is indicated by the vertical dotted line $k$ in Figs. 4 and 7.

To operate the engine full condensing the valve 29 is opened, the outlet 28 is shut off by closing down the valve 30, and the exhaust diverting valve 34 is locked in the position shown in Fig. 18, as previously described, when the exhaust steam passes directly from the cylinder exhaust ports 17 and 18 through valve 21 into the chamber 19 and thence through the outlet 27 to the condenser. The indicator diagram produced during this operation is represented by the full line $a$ and dash and dotted line $d$, of Fig. 7, and produces the highest possible economy for a uniflow engine.

If the ports 32 and 33 are cut off from the condenser, and it is desired to operate the engine non-condensing and utilize the exhaust steam at some back pressure in one, two or three distinct and independent auxiliary apparatus, the valves 29 and 30 are shut down, thus closing outlets 27 and 28, and the exhaust diverting valve 34, during its oscillatory movement, when attached to the valve gear, connects the valve port 35 with either of the ports 31, 32 or 33, and lead the exhaust steam to one, or a plurality of distinct and independent sources for further use, or to the atmosphere, and the resultant indicator diagram will be as illustrated by lines $e$ and $f$ in Fig. 8.

During the normal operation and for which the engine was designed, when the exhaust steam is utilized for heating or the like and the condenser is in operation, the outlets 27 and 28 are closed by shutting the valves 29 and 30, and the exhaust diverting valve 34 is connected to the valve gear, the port 35 of said diverting valve communicates with the exhaust chamber 19 and in turn with the ports or passageways 31, 32 and 33 as herein explained in connection with the cycle of operation illustrated in Figs. 10 to 17, inclusive. The resultant indicator diagram during this operation of the engine is represented by the full lines $g$ and $h$ in Fig. 9, while the dotted line $i$ in Fig. 9, represents the back pressure when the engine is exhausting into the atmosphere. The shaded area between the lines $h$ and $i$ represents the gain when the engine is running on a heating system or other steam or heat utilizing accessories and condensing simultaneously over that when it is exhausting into the atmosphere without additional supply of steam.

Figure 2:
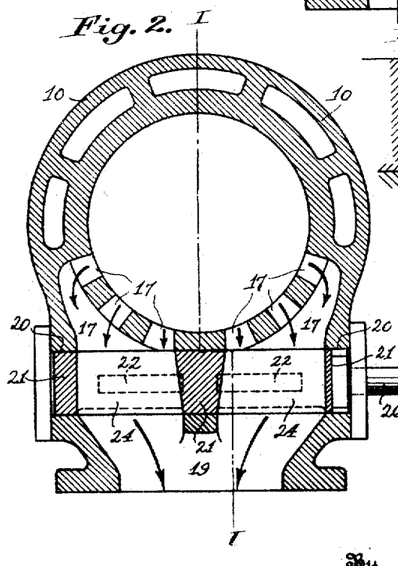
Fig. 2 is a transverse section taken on line II—II of Fig. 1.

While I have described in detail, by reference to Figs. 10 to 17, inclusive, the operation of the invention as shown in Figs. 5 and 6 in which my form of uniflow engine comprising only two exhaust ports controlled by a single valve is combined with a single exhaust diverting valve, it will not be necessary to further explain the operation of the uniflow engine *per se*, shown in Figs. 1 and 2, as the cycle of operations is identical with that shown and described with reference to said Figs. 10 to 17, with the exception that the operations and functions of the exhaust diverting valve 34, its port 35, and coöperating ports 31, 32 and 33, may be omitted, and my present invention embraces and contemplates the use of such a uniflow engine without an exhaust diverting valve or other accessories as shown in Figs. 1 and 2, as well as with an exhaust diverting valve, as shown for example in Figs. 5 and 6.

In the use of the form of slide or reciprocating exhaust controlling valve 25 as shown in Fig. 3, the length of the cylinder exhaust ports 17' and 18' are reduced to the shortest length and hence a minimum of clearance and maximum of economy and efficiency are effected.

While my engine in some respects resembles the counter-flow design, it avoids all the disadvantages of such a design and embodies and has all the advantages of a uniflow type, and excels in economy over other uniflow engines, for the reason that it employs a smaller piston and clearance owing to a minimum number of cylinder exhaust ports and short ports as shown in Fig. 3, and only one-third of the compression of prior uniflow engines, and hence accomplishes a much coveted steam economy desired by all engine builders, without much additional and complicated valves and mechanism.

In all the uses to which the present invention is applied and herein disclosed, whether the exhaust is diverted to the atmosphere, heating plant, condenser, or different combinations of such diversions, if running on a short cut off, the influence of the additional clearance volume is practically negligible, for the reason, that when during the expansion of the live steam the piston 14 uncovers ports 17 or 18 as shown in Figs. 13, and 17, that before this additional volume of the port 17 or 18 is in communication with the cylinder volume, the live steam pressure and temperature of the steam have decreased to such an extent, that the detriment to the expansive powers of the live steam may be disregarded compared with the important benefits obtained as herein pointed out. If the engine is run on a long cut-off, that is about thirty per cent. or more, the additional clearance volume will be filled with live steam during admission and its hurtful influence is entirely eliminated and these additional clearance spaces do not affect the compression as the clearances employed at the ends of the cylinder are no more than that employed in any other high grade counterflow steam engine.

From the foregoing disclosure as to the construction, mode of operation and advantages of my invention, it will be readily seen that I have evolved not only a new type of uniflow engine but a most efficient arrangement and combination of elements for operating a uniflow engine, and separate or subdivide the exhaust steam from said engine, so that I am capable of supplying a heating plant or other accessory apparatus of the plant with said divided exhaust steam without extra supply steam, and operate the same with the highest economy, and without in any way affecting the highly efficient operation of the engine under all working conditions, and while I have described and shown my preferred form of invention, I am not limited to this specific form, as many changes and modifications will readily suggest themselves to any one skilled in the art, as, for example, any well known and common form of valve may be substituted for any one of the valves shown in the drawings and within the scope of the claims without departing from the spirit of my invention.

What I claim is:

1. A steam engine of the uniflow type comprising a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder, and a single valve controlling the two exhaust ports and first opening the exhaust port adjacent the piston to the expanded steam and later the other exhaust port.

2. A steam engine of the uniflow type comprising a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder, and a single three-ported valve controlling the two exhaust ports and first opening the exhaust port adjacent the piston to the expanded steam and later the other exhaust port.

3. A steam engine of the uniflow type comprising a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder, and an oscillating and single three-ported valve controlling the two exhausts ports and first opening the exhaust port adjacent the piston to the expanded steam and later the other port.

4. A steam engine of the uniflow type comprising a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder and said exhaust ports removed from the end of the cylinder approximately the length of the piston, and a single valve controlling the two exhaust ports and first opening the exhaust port adjacent the piston to the expanded steam and later the other port.

5. A steam engine of the uniflow type comprising a cylinder, a piston within the cylinder, a live steam inlet port at each end of the cylinder, means for controlling the admission of live steam through said live steam ports and to the opposite sides of the piston, a main or end exhaust port between the center and each end of the cylinder, and a single valve controlling the two main or end exhaust ports, said valve constructed, arranged and operated whereby the main exhaust port of one stroke becomes an end exhaust port during the following stroke.

6. A steam engine of the uniflow type comprising a cylinder, a piston within the cylinder, a live steam inlet port at each end of the cylinder, means for controlling the admission of live steam through said live steam ports and to the opposite sides of the piston, a main or end exhaust port between the center and each end of the cylinder, and a single oscillating and ported valve controlling the two main or end exhaust ports, said valve constructed, arranged and operated whereby the main exhaust port of one stroke becomes an end exhaust port during the following stroke.

7. A steam engine of the uniflow type comprising a cylinder, a piston within the cylinder, a live steam inlet port at each end of the cylinder, means for controlling the admission of live steam through said live steam ports and to the opposite sides of the piston, a combined main and auxiliary exhaust port between the center and each end of the cylinder, and a single valve controlling the two combined main and auxiliary exhaust ports.

8. In a steam engine of the uniflow type, the combination of a cylinder, a piston within the cylinder, a live steam inlet port at each end of the cylinder, means for controlling the admission of live steam through said ports and to the opposite sides of the piston, a combined main and auxiliary exhaust port between the center and each end of the cylinder, each of said combined main and auxiliary ports removed from the adjacent end of the cylinder approximately the length of the piston and a single valve controlling the two combined main and auxiliary exhaust ports and first opening the exhaust port adjacent the piston to the expanded steam and later the other exhaust port.

9. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder, a single valve controlling the two exhaust ports and first opening the exhaust port adjacent the piston to the expanded steam and later the other exhaust port, a plurality of independent and final exhaust passageways, and exhaust diverting valve coöperating with said single valve for controlling the diversion of the exhaust steam into said plurality of independent exhaust passageways.

10. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder, a single valve controlling the two exhaust ports and first opening the exhaust port adjacent the piston to the expanded steam and later the other exhaust port, a plurality of independent and final exhaust passageways, and an exhaust diverting valve coöperating with said single valve for controlling the diversion of the exhaust steam into said plurality of independent exhaust passageways.

11. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separated sections along the length of the cylinder, an oscillating and single three-ported valve controlling the two exhaust ports and first opening the exhaust port adjacent the piston to the expanded steam and later the other exhaust port, a plurality of independent and final exhaust passageways, and exhaust diverting valve mechanism coöperating with said single three-ported valve for controlling the diversion of the exhaust steam at different pressures into said plurality of independent exhaust passageways.

12. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent main or auxiliary exhaust ports at different and separate sections along the length of the cylinder and said exhaust ports removed from the ends of the cylinder approximately the length of the piston, a single valve controlling the two exhaust ports and first opening the exhaust port adjacent the piston to the expanded steam and later the other exhaust port, a plurality of independent and final exhaust passageways, and an exhaust diverting valve coöperating with said single valve for controlling the diversion of the exhaust steam at different pressures into said plurality of independent exhaust passageways.

13. In a steam engine of the uniflow type, the combination of a cylinder, a piston within the cylinder, a live steam inlet port at each end of the cylinder, means for controlling the admission of live steam through said live steam ports and to the opposite sides of the piston, a combined main and end exhaust port between the center and each end of the cylinder, a single valve controlling the two combined main and end exhaust ports, said valve constructed, arranged and operated whereby the exhaust port nearest to the piston at the end of one stroke then acting as main exhaust port becomes an end exhaust port during the following stroke, a plurality of independent and final exhaust passageways and exhaust diverting valve mechanism arranged, constructed and coöperating with said single valve to divert the exhaust passing through the two ports when acting as main exhaust ports into one of said passageways and the exhaust at a lower pressure passing through the ports when acting as end exhaust ports into another of said passageways.

14. In a steam engine of the uniflow type, the combination of a cylinder, a piston within the cylinder, a live steam inlet port at each end of the cylinder, means for controlling the admission of live steam through said live steam ports and to the opposite sides of the piston, a main or end exhaust port between the center and each end of the cylinder, a single valve controlling the two main or end exhaust ports, said valve constructed, arranged and operated whereby the exhaust port nearest to the piston at the end of one stroke then acting as main exhaust port becomes an end exhaust port during the following stroke, a plurality of independent and final exhaust passageways and an exhaust diverting valve arranged, and constructed and coöperating with said exhaust valve to divert the exhaust passing through the two main exhaust ports into one of said passageways and the exhaust at a lower pressure passing through the end exhaust ports into another of said passageways.

15. In a steam engine of the uniflow type, the combination of a cylinder, a piston within the cylinder, a live steam inlet port at each end of the cylinder, means for controlling the admission of live steam through said live steam ports and to the opposite sides of the piston, a combined main and auxiliary exhaust port between the center and each end of the cylinder, a single valve controlling the two combined main and auxiliary exhaust ports, a plurality of independent and final exhaust passageways, and exhaust diverting valve mechanism arranged, constructed and coöperating with said single valve to divert the exhaust passing through the ports when adjacent to the piston and acting as main exhaust ports into one of said passageways and the exhaust at a lower pressure passing through the ports when acting as auxiliary exhaust ports into another of said passageways.

16. In a steam engine of the uniflow type, the combination of a cylinder, a piston within the cylinder, a live steam inlet port at each end of the cylinder, means for controlling the admission of live steam through said live steam ports and to the opposite sides of the piston, a combined main and auxiliary exhaust port between the center and each end of the cylinder, each of said combined main and auxiliary ports removed from the adjacent end of the cylinder approximately the length of the piston, a single valve controlling the two combined main and auxiliary exhaust ports, a plurality of independent and final exhaust passageways, and an exhaust diverting valve arranged, constructed and coöperating with said single valve to divert the exhaust passing through the ports when adjacent to the piston and acting as main exhaust ports into one of said passageways and the exhaust at a lower pressure passing through the ports when acting as auxiliary exhaust ports into another of said passageways.

17. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent combined main and auxiliary exhaust ports at different and separated sections along the length of the cylinder, an exhaust chamber, a single valve controlling the said two exhaust ports and outlet into the exhaust chamber, a plurality of independent and final exhaust passageways, and exhaust diverting valve mechanism for controlling the diversion of the exhaust steam of one and the same stroke from the exhaust chamber into said plurality of independent and final exhaust passageways at different pressures.

18. In a steam engine of the uniflow type, the combination of a cylinder, a piston within the cylinder, a live steam inlet port at each end of the cylinder, means for controlling the admission of live steam through said live steam ports and at the opposite sides of the piston, two distinct and independent combined main and auxiliary exhaust ports at different and separated sections along the length of the cylinder, an exhaust chamber, a single valve controlling the said two exhaust ports and outlet into the exhaust chamber, a plurality of independent and final exhaust passageways, and a single exhaust diverting valve for controlling the diversion of the exhaust steam of one and the same stroke from the exhaust chamber into said plurality of independent and final exhaust passageways at different pressures.

19. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent combined main and auxiliary exhaust ports at different and separated sections along the length of the cylinder, an exhaust chamber, an oscillating and single three-ported valve controlling the said two exhaust ports and outlet into the exhaust chamber, a plurality of independent and final exhaust passageways, and a single exhaust diverting valve for controlling the diversion of the exhaust steam of one and the same stroke from the exhaust chamber into said plurality of independent and final exhaust passageways at different pressures.

20. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent combined main and auxiliary cylinder exhaust ports at different and separated sections along the length of the cylinder, an exhaust chamber communicating with said cylinder exhaust ports, a single valve controlling the communication of the two independent combined main and auxiliary cylinder exhaust ports with the exhaust chamber, a plurality of final exhaust passageways in communication with the exhaust chamber and exhaust diverting valve mechanism controlling the communication of the exhaust chamber with the final exhaust passageways, said diverting valve mechanism constructed, arranged and coöperating with said single valve whereby the exhaust steam of the same stroke is divided and diverted into said final exhaust passageways and at different pressures.

21. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent combined main and auxiliary cylinder exhaust ports at different and separated sections along the length of the cylinder, an exhaust chamber communicating with the said cylinder exhaust ports and having an outlet controlled by a valve, a single valve controlling the communication of the said two independent cylinder exhaust ports with the exhaust chamber, a plurality of final exhaust passageways in communication with the exhaust chamber and a single exhaust diverting valve coöperating with said single exhaust valve and controlling the communication of the exhaust chamber with the said exhaust passageways in such a manner as to divide and divert the exhaust steam of the same stroke into separate volumes at different and decreasing pressures.

22. In a steam engine of the uniflow type, the combination of a cylinder, a piston within the cylinder, a live steam inlet port at each end of the cylinder, means for controlling the admission of live steam through said live steam ports and to the opposite sides of the piston, two distinct and independent combined main and auxiliary cylinder exhaust ports at different and separated sections along the length of the cylinder, an exhaust chamber communicating with said cylinder exhaust ports and having two outlets each of which is controlled by a valve, a single valve controlling the communication of the two independent combined main and auxiliary cylinder exhaust ports with the exhaust chamber, a plurality of final exhaust passageways, in communication with the exhaust chamber and exhaust diverting valve mechanism controlling the communication of the exhaust chamber with the exhaust passageways and coöperating with said single valve in such a manner as to divide the exhaust steam of the same stroke into different volumes and divert the same into said exhaust passageways at different and decreasing pressures.

23. An engine comprising a cylinder having two combined main and auxiliary exhaust ports, a piston controlling the inlets of said exhaust ports, a single valve controlling the outlets of said combined main and auxiliary exhaust ports, a plurality of independent final exhaust passageways, in combination with a single exhaust diverting valve coöperating with said single exhaust valve and controlling the exhaust fluid of the same and every stroke independently through said final exhaust passageways at different pressures.

24. A steam engine of the uniflow type comprising a cylinder, a piston within the cylinder, a live steam inlet port at each end of the cylinder, means for controlling the admission of live steam through said live steam ports and to the opposite sides of the piston, a combined main and end exhaust port between the center and each end of the cylinder, a single valve controlling the two combined main and end exhaust ports, said valve constructed, arranged and operated whereby the main exhaust port of one stroke becomes an end exhaust port during the following stroke, a plurality of independent exhaust passageways, in combination with exhaust diverting valve mechanism arranged and constructed to divert the exhaust passing through the two ports when acting as main exhaust ports into one of said passageways and the exhaust through the ports when acting as end exhaust ports into another of said passageways.

25. A steam engine of the uniflow type comprising a cylinder, a piston within the cylinder, a live steam inlet port at each end of the cylinder, means for controlling the admission of live steam through said live steam ports and to the opposite sides of the piston, a main or end exhaust port between the center and each end of the cylinder, a single valve controlling the two main or end exhaust ports, said valve constructed, arranged and operated whereby the main exhaust port of one stroke becomes an end exhaust port during the following stroke, a pluralty of independent exhaust passageways, in combination with an exhaust diverting valve arranged and constructed to deliver the exhaust passing through the two main exhaust ports into one of said passageways and the exhaust passing through the end exhaust ports into another of said passageways.

26. A steam engine of the uniflow type comprising a cylinder, a piston within the cylinder, a live steam inlet port at each end of the cylinder, means for controlling the admission of live steam through said live steam ports and to the opposite sides of the piston, a combined main and auxiliary exhaust port between the center and each end of the cylinder, a single valve controlling the two combined main and auxiliary exhaust ports, a plurality of independent exhaust passageways, in combination with exhaust diverting valve mechanism arranged and constructed to divert the exhaust passing through the ports when acting as main exhaust ports into one of said passageways and the exhaust passing through the ports when acting as auxiliary exhaust ports into another of said passageways.

In testimony whereof I hereby affix my signature.

FREDERICK W. BÖSCH.